(12) United States Patent
Georgiev et al.

(10) Patent No.: US 6,377,712 B1
(45) Date of Patent: Apr. 23, 2002

(54) ITERATIVELY BUILDING DISPLACEMENT MAPS FOR IMAGE WARPING

(75) Inventors: Todor G Georgiev, Campbell; Mark Hamburg, Scotts Valley, both of CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 09/545,959

(22) Filed: Apr. 10, 2000

(51) Int. Cl.$^7$ .............................. G06K 9/32; G06T 11/00
(52) U.S. Cl. ........................................ 382/293; 345/619
(58) Field of Search ................................. 382/293, 294, 382/279, 282, 284, 285; 345/433, 435, 418, 419, 427, 425, 619, 629

(56) References Cited

U.S. PATENT DOCUMENTS

| | | | | |
|---|---|---|---|---|
| 5,175,808 A | * | 12/1992 | Sayre | 345/433 |
| 5,533,084 A | * | 7/1996 | Mazess | 378/54 |
| 5,611,000 A | * | 3/1997 | Szeliski et al. | 382/294 |
| 5,764,807 A | * | 6/1998 | Pearlman et al. | 382/240 |
| 5,923,329 A | * | 7/1999 | Beale | 345/418 |
| 6,009,212 A | * | 12/1999 | Miller et al. | 382/294 |

OTHER PUBLICATIONS

"Advanced Engineering Mathematics," Kreyszig, John Wiley & Son, New York, 6th edition, 1988, pp. 1015–1017, 1083–1088.*

"Conformal Image Warping," Frederick et al, IEEE Computer Graphics & Applications, Mar. 1990, pp. 54–61.*

Gomes et al., *Warping and Morphing of Graphical Objects*, Morgan Kaufmann Publishers, Inc., San Francisco, California, 1999, pp. 73–75.

Gomes et al., *Warping and Morphing of Graphical Objects*, Morgan Kaufmann Publishers, Inc., San Francisco, California, 1999, Chapter 4, pp. 81–110.

Vetterling et al., *Numerical Recipes Example Book (C)*, (Table of Contents only), Second Edition, Cambridge University Press.

\* cited by examiner

*Primary Examiner*—Wenpeng Chen
(74) *Attorney, Agent, or Firm*—Fish & Richardson P.C.

(57) ABSTRACT

A method and apparatus, including a computer program apparatus, implementing techniques for warping a digital image. The iterative mesh-based warping techniques select a plurality of elements from a dense mesh, each element of the mesh corresponding to one or more pixels of a digital image and representing a vector of displacement values. A kernel is applied iteratively to the mesh in order to update the selected elements with new displacement values until a termination condition is achieved, such as the convergence of the displacement values to a fixed point. The kernel is selected so that the iterations converge to a solution of an appropriate differential equation. The resultant mesh is applied to the digital image, thereby warping the image according to the new displacement values. The displacement values of the selected elements and the non-selected elements as used as inputs to the kernel. The new displacement values generated by the kernel are written to the selected elements without updating the displacement values of the non-selected elements.

23 Claims, 9 Drawing Sheets

201

211

| 0  | 0 | 0  | 1  | 0 | 0  |
|----|---|----|----|---|----|
| 0  | 0 | 1  | 0  | 0 | 0  |
| -1 | 0 | 0  | 0  | 1 | 0  |
| 0  | 1 | 0  | 0  | 0 | -1 |
| 0  | 0 | 0  | -1 | 0 | 0  |
| 0  | 0 | -1 | 0  | 0 | 0  |

203

| 0 | 1  | 0 |
|---|----|---|
| 1 | -4 | 1 |
| 0 | 1  | 0 |

205

| 0  | 0  | -1  | 0  | 0  |
|----|----|-----|----|----|
| 0  | -2 | 8   | -2 | 0  |
| -1 | 8  | -20 | 8  | -1 |
| 0  | -2 | 8   | -2 | 0  |
| 0  | 0  | -1  | 0  | 0  |

207

| 0 | 0   | 0   | 1    | 0   | 0   | 0 |
|---|-----|-----|------|-----|-----|---|
| 0 | 0   | 3   | -12  | 3   | 0   | 0 |
| 0 | 3   | -24 | 57   | -24 | 3   | 0 |
| 1 | -12 | 57  | -112 | 57  | -12 | 1 |
| 0 | 3   | -24 | 57   | -24 | 3   | 0 |
| 0 | 0   | 3   | -12  | 3   | 0   | 0 |
| 0 | 0   | 0   | 1    | 0   | 0   | 0 |

209

| 0  | 0  | 0    | 0    | -1   | 0    | 0    | 0  | 0  |
|----|----|------|------|------|------|------|----|----|
| 0  | 0  | 0    | -4   | 16   | -4   | 0    | 0  | 0  |
| 0  | 0  | -6   | 48   | -112 | 48   | -6   | 0  | 0  |
| 0  | -4 | 48   | -216 | 400  | -216 | 48   | -4 | 0  |
| -1 | 16 | -112 | 400  | -676 | 400  | -112 | 16 | -1 |
| 0  | -4 | 48   | -216 | 400  | -216 | 48   | -4 | 0  |
| 0  | 0  | -6   | 48   | -112 | 48   | -6   | 0  | 0  |
| 0  | 0  | 0    | -4   | 16   | -4   | 0    | 0  | 0  |
| 0  | 0  | 0    | 0    | -1   | 0    | 0    | 0  | 0  |

| 0 | 0 | 0 | 1 | 0 | 0 |
|---|---|---|---|---|---|
| 0 | 0 | 1 | 0 | 0 | 0 |
| -1 | 0 | 1 | 0 | 1 | 0 |
| 0 | 1 | 0 | 1 | 0 | -1 |
| 0 | 0 | 0 | -1 | 0 | 0 |
| 0 | 0 | -1 | 0 | 0 | 0 |

303

| 0 | 1 | 0 |
|---|---|---|
| 1 | 0 | 1 |
| 0 | 1 | 0 |

305

| 0 | 0 | -1 | 0 | 0 |
|---|---|---|---|---|
| 0 | -2 | 8 | -2 | 0 |
| -1 | 8 | 12 | 8 | -1 |
| 0 | -2 | 8 | -2 | 0 |
| 0 | 0 | -1 | 0 | 0 |

307

| 0 | 0 | 0 | 1 | 0 | 0 | 0 |
|---|---|---|---|---|---|---|
| 0 | 0 | 3 | -12 | 3 | 0 | 0 |
| 0 | 3 | -24 | 57 | -24 | 3 | 0 |
| 1 | -12 | 57 | 144 | 57 | -12 | 1 |
| 0 | 3 | -24 | 57 | -24 | 3 | 0 |
| 0 | 0 | 3 | -12 | 3 | 0 | 0 |
| 0 | 0 | 0 | 1 | 0 | 0 | 0 |

309

| 0 | 0 | 0 | 0 | -1 | 0 | 0 | 0 | 0 |
|---|---|---|---|---|---|---|---|---|
| 0 | 0 | 0 | -4 | 16 | -4 | 0 | 0 | 0 |
| 0 | 0 | -6 | 48 | -112 | 48 | -6 | 0 | 0 |
| 0 | -4 | 48 | -216 | 400 | -216 | 48 | -4 | 0 |
| -1 | 16 | -112 | 400 | 1372 | 400 | -112 | 16 | -1 |
| 0 | -4 | 48 | -216 | 400 | -216 | 48 | -4 | 0 |
| 0 | 0 | -6 | 48 | -112 | 48 | -6 | 0 | 0 |
| 0 | 0 | 0 | -4 | 16 | -4 | 0 | 0 | 0 |
| 0 | 0 | 0 | 0 | -1 | 0 | 0 | 0 | 0 |

FIG. 3

ITERATIVELY BUILDING DISPLACEMENT MAPS FOR IMAGE WARPING

BACKGROUND

The present invention relates to methods and systems for warping digital images.

Digital image warping is a form of image processing that uses geometric transformation techniques in order to achieve a wide variety of different artistic effects or image corrections related to changing the shape and size of objects in the image. Generally, an image processing application (computer program) will have a number of predefined warping functions referred to as 'canned' transforms. Each such transform represents a particular artistic effect and is described by a small set of functions depending on a limited number of parameters. By selecting one or more of the canned transforms, a user can perform a limited set of distortions on an image. Although canned transforms offer a variety of effects, they lack flexibility. Many kinds of distortions cannot be performed with canned transforms, which are good only for the effect for which they are designed.

General warping offers much more flexibility than the canned transforms. In general warping, the user defines the desired distortions at a number of points and then a warping engine interpolates the distortions to all of the remaining pixels of the image. Conventional warping applications allow the user to define and apply a variety of warping interpolations such as bilinear and bi-cubic. This has been done in different ways, with different levels of smoothness and flexibility.

General warping achieves its greater flexibility at a high cost of user effort. To achieve a good visual effect, the user must define the distortion at a large number of points throughout the image. Often, general warping requires that the user define hundreds of points of distortion 'by hand', which is labor intensive and time consuming.

SUMMARY OF THE INVENTION

In general, the invention provides a method and apparatus, including a computer program apparatus, implementing techniques to iteratively build meshes for image warping, where each mesh represents a solution to corresponding differential equation.

According to one aspect, the techniques are directed to a method of processing an input image using an array of displacement values, referred to as a "mesh" of displacement values or as a displacement "map." Each element of the array contains a value representing a displacement for a plurality of pixels of the input image. A kernel, related to a transformation function, is iteratively applied to the array until a termination condition is achieved, such as the convergence of the displacement values to a solution of a differential equation. During each iteration, user-selected elements of the array define the boundary conditions for the transformation function. The new displacement values are written to selected elements without updating the displacement values of the non-selected elements. Finally, the digital image is warped according to the new displacement values.

The user can define the initial array of displacement values and can edit the array throughout the process. After applying a kernel to the mesh, the user can preview the resulting warped image. The user can elect to further edit the mesh and apply other kernels or, if a desired warping effect has been achieved, can apply the mesh to the original image, thereby warping the image in accordance with the new displacement values.

In another aspect, the invention is directed to a system in which an iteration engine executes within an operating environment provided by a computer. The iteration engine is given a plurality of selected elements from the array and iteratively applies the kernel to the array to update the selected elements with new displacement values until a termination condition is achieved. Upon termination, a warping engine transforms the digital image according to the new displacement values, thereby warping the digital image.

The invention offers several advantages including greater flexibility than canned image transformations and greater control than general warping. By iteratively applying the kernels, the invention directly constructs a transformation function as a solution to a corresponding differential equation based on user-defined boundary conditions.

Various embodiments of the invention are set forth in the accompanying drawings and the description below. Other features and advantages of the invention will become apparent from the description, the drawings, and the claims.

BRIEF DESCRIPTION OF THE DRAWINGS

FIG. 2 illustrates three kernels representing lowest order differential operators.

FIG. 3 illustrates five kernels suitable for iteratively building the mesh for warping an input digital image.

DETAILED DESCRIPTION

Figure 1:
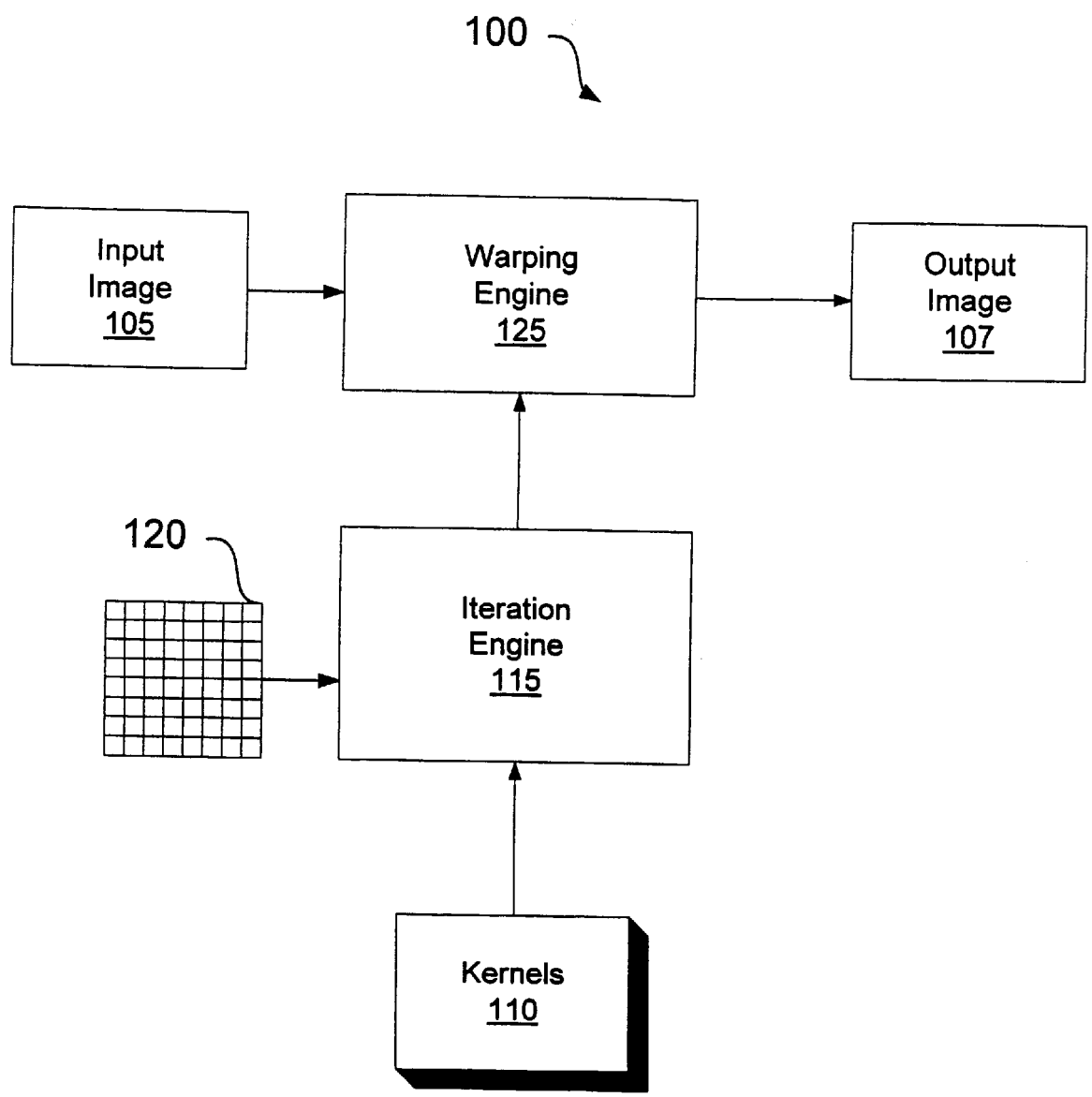
FIG. 1 is a block diagram illustrating an image warping system and various components of the invention.

FIG. 1 is a block diagram illustrating a system 100 and the basic components of the invention. Generally, system 100 produces output image 107 by applying mesh 120 to input digital image 105. Based on a desired warping effect, iteration engine 115 iteratively applies kernels 110 to mesh 120 such that mesh 120 converges to a solution of a corresponding differential equation as a function of user-defined boundary conditions. Kernels 110 represent geometric transforms that warp digital image 105 and produce different levels of smoothness, rigidity, or flexibility. Warping engine 125 applies the resultant mesh 120 to input digital image 105 in order to generate output digital image 107, thereby warping input image 105 to achieve unique artistic effects.

Mesh 120 is an array of elements, each element representing a displacement vector and corresponding to one or more pixels of output image 107. For example, in one implementation mesh 120 has dimensions of N/4 by M/4 and output image 107 has dimensions of N by M. In this configuration, each element of mesh 120 corresponds to 16 pixels of output image 107. In one implementation, each element of mesh 120 has two displacement values: a vertical displacement and a horizontal displacement. Together, the vertical and horizontal displacement values represent a vector for mapping destination pixels in output image 107 to source pixels in input image 105. For example, assume a one-to-one mapping from mesh 120 to output image 107. In this configuration, a mesh element M(21,30) having displacement values (5,5) instructs warping engine 125 to update pixel data for element (21,30) of output image 107 by sampling pixel data from element (26,35) of input image 105. Alternatively, mesh 120 can contain displacement values corresponding to one or more pixels of input image 105 and map pixels from input image 105 to pixels within output image 107. In this manner, mesh 120 represents any suitable array of displacement values.

According to the invention, iteration engine 115 applies iteratively one or more kernels 110 to selected elements of mesh 120 until a termination condition is reached, such as a predetermined number of iterations where mesh 120 is known to converge to a fixed point. Iteration engine 115 uses the displacement values from both selected and non-selected elements as inputs to the iteration process, but only modifies the selected elements of mesh 120. After the termination condition has been reached, warping engine 125 warps input image 105 by applying the resultant mesh 120 to input image 105, thereby generating output image 107. In this manner, system 100 digitally warps image 105 in order to quickly and efficiently create an artistic effect.

The displacement values of mesh 120 can be initially defined by a user and can be edited throughout the process. After iteratively applying a kernel to mesh 120, the user can preview the resulting warped output image 107 and can repeat the warping process until a desired warping effect is achieved. Upon achieving the desired effect, the user can elect to apply mesh 120 to input image 105 to produce output image 107.

Each kernel 110 is selected such that, when iteratively applied, the displacement values of mesh 120 converge to a fixed point. For example, in one implementation the displacement values converge to a solution to a differential equation such as Laplace's equation, or an equation related to Laplace' equation such as the "square root of Laplace's equation" or Laplace's equation to any integer or half integer power.

Solutions to Laplace's equation have conventionally been used to model physical properties. For example, solutions to Laplace's equation are known as "harmonic" functions and are often used to describe heat distribution, diffusion and electric potential. A "bi-harmonic" function is a solution to a Bi-Laplacean equation, i.e., "Laplace's equation raised to the power two." Bi-harmonic functions are related to distortions of elastic media such as rubber. Solutions to higher order equations, such as "the Laplace equation raised to the power 3 or 4," are smoother and more flexible.

A function f( ) satisfies Laplace's equation if the sum of the second derivatives of f ( ) equals zero. For example, in the two-dimensional case, the function f(x,y) is a solution to Laplace's equation if the sum of the second derivatives in the x and y directions equals zero. Thus, the two-dimensional Laplace's equation can be written as follows:

$$\frac{\partial^2 f}{\partial x^2} + \frac{\partial^2 f}{\partial y^2} = 0$$

Furthermore, in modeling physical properties, it is know that matrices can be used to iteratively build solutions for differential equations. See *Numerical Recipes in C—The Art of Scientific Computing, 2$^{nd}$ Edition*, William H. Press et. al. Cambridge University Press. For example, consider the following equation for modeling the dissipation of heat in space, where D is a matrix corresponding to the Laplacean operator, k is a constant and d/dt is the time derivative:

$$D \cdot f = k \frac{d}{dt} f$$

Discretizing this equation with a time step 1 results in a series of equations in which, for each time step, the new functionf(t+1) can be derived by multiplying the previous function f( )by the Laplacean and a constant 1k:

$$f(t+1) = f(t) + \frac{1}{k} \cdot D \cdot f(t)$$

When 1/k is below a certain threshold, referred to as the stability threshold, this iterative process converges to a fixed point, reflecting the physical characteristic that heat spreads until it reaches a stationary state. Larger values for 1/k lead to faster convergence, so long as 1/k is less than the stability threshold. Equations where D represents a power of the Laplacean and can be treated in a similar way and solved by iterations.

FIG. 2 illustrates kernels for the square root of the Laplacean (201), Laplacean (203), Bi-laplacean (205), the "Laplacean to the third power" (207), and the "Laplacean to fourth power" (209). These kernels, when iteratively applied to mesh 120 as described above, build a solution to the corresponding differential equation. The above-described techniques can be extended to higher-order equations by convolution of kernels 201 and 203. For example, a bi-harmonic transformation function satisfies:

D(D(f))=0, where D is the Laplacean kernel 203

Kernel 205 is a representation of the above differential operator, the bi-Laplacean, and f( ) satisfies the above equation, and is called is a bi-harmonic function. Kernel 205 can be generated by convolving kernel 203 with itself. Kernels for higher-order equations can similarly be constructed. For example, the "Laplacean to the 1.5 power" can be generated by convolving kernel 203 with kernel 201. A kernel corresponding to a K-harmonic function can be generated by convolving kernel 203 upon itself K-1 times. There is no upper limit to the kernels that can be generated. The power can be any integer or half integer. However, as the order increases the kernel gets more complex and requires more iterations to converge.

The conformal kernel 201 can be used to warp a digital image yet preserve local angles and shapes within the image. It has been determined that an efficient conformal kernel can be constructed by taking the square root of Laplace's operator. The resultant equations, conventionally referred to as Cauchy-Riemann equations, are:

$$\frac{\partial u}{\partial y} + \frac{\partial v}{\partial x} = 0$$

$$\frac{\partial u}{\partial y} - \frac{\partial v}{\partial y} = 0$$

As such, the Cauchy-Riemann differential operator is a square root of the Laplacean and can be represented by the following matrix acting on the vector (u, v):

$$\begin{pmatrix} \frac{\partial}{\partial y} & \frac{\partial}{\partial x} \\ \frac{\partial}{\partial x} & \frac{-\partial}{\partial y} \end{pmatrix}$$

Kernel 201 represents the Cauchy-Riemann differential operator. A conformal transformation function f=(u, v) satisfies:

$$D(f)=0, \text{ where } D \text{ the conformal kernel 201}$$

The other square root of the Laplacean defines anti-conformal mappings that are conformal warpings of the flipped (mirror) image:

$$\begin{pmatrix} \frac{\partial}{\partial y} & \frac{-\partial}{\partial x} \\ \frac{-\partial}{\partial x} & \frac{-\partial}{\partial y} \end{pmatrix}$$

For integer power kernels, iteration engine 115 independently applies the kernel to the horizontal and vertical displacement values of each element. For kernel 201 or any other half-integer kernel, iteration engine 115 treats the horizontal and vertical displacement values of the mesh together. Therefore, iteration engine 115 applies kernel 201 as a 3×3 array of 2×2 matrices. Each of these matrices acts on a displacement vector. In one implementation, each time the conformal kernel 201 is applied, a harmonic kernel 203 is also applied to achieve better stability.

FIG. 3 lists kernels 301 through 309 that after iteration converge to solutions of the corresponding differential equation as described above. During application of kernels 110, the displacement values within mesh 120 converge to a solution that depends on the boundary conditions defined by the selected elements of mesh 120 as specified by the user. The resultant displacement values of mesh 120 depend on the distortion, and the derivatives of the distortion, at the user-defined boundaries. For example, for a harmonic kernel, the solution depends only on the distortion at the boundary of the selected area. For a bi-harmonic kernel, the solution depends on the distortion and the first derivative of the distortion. Similarly, for a tri-harmonic kernel, the solution depends on the distortion and the first and second derivatives of the distortion. Iteration engine 115 applies kernels 110 to mesh 120, as described below, such that the displacement values of mesh 120 converge to a fixed point based on these boundary conditions. Other representations of the Laplacean and the Cauchy-Riemann operators lead to other suitable kernels and may produce higher quality meshes but are generally larger and converge more slowly than the kernels described above.

Figure 4:
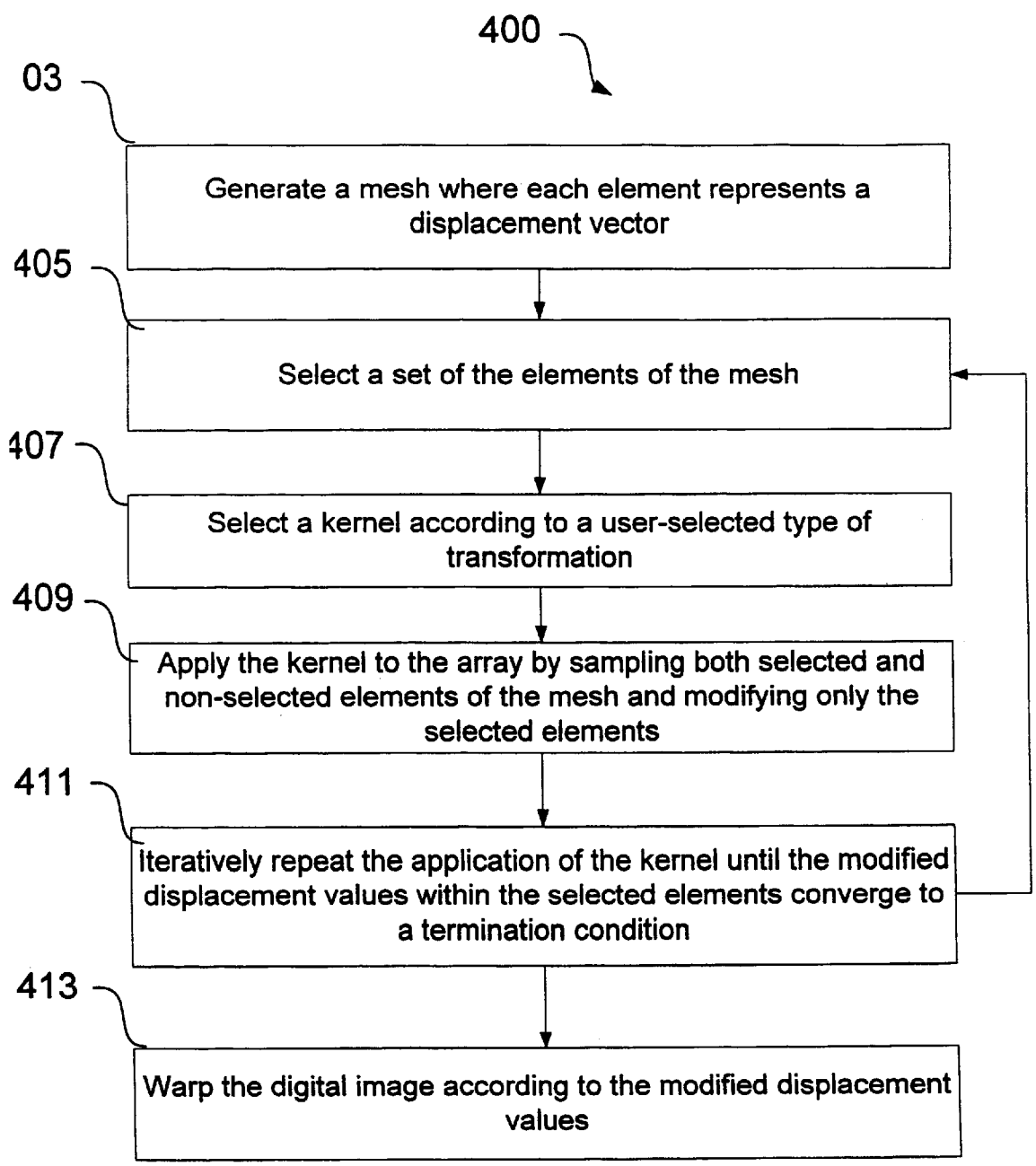
FIG. 4 is a flowchart illustrating one embodiment of a computerized process for warping a digital image according to the invention.

FIG. 4 is a flow chart illustrating one implementation of a process 400 suitable for implementation in a computer program application, such as iteration engine 115, to warp a digital image. The computer program generates mesh 120 using any number of conventional techniques (step 203). In addition, the user can define the displacement values of the mesh. Just as the image is a two-dimensional array of pixel data, mesh 120 is typically a two-dimensional array of elements where each element stores a displacement vector such as a horizontal and a vertical displacement. Each element of mesh 120 corresponds to one or more pixels within the output image 107.

The computer program selects a set of elements of mesh 120 (step 405). The selected set may be a subset of the elements of the mesh or may include all of the elements. This step is often in response to a user command. For example, the user may instruct the computer program to apply a particular transformation function to the entire input image 105. In this case, the computer program selects all of the elements of mesh 120. Alternatively, the user may use a computer-generated paintbrush to apply the transformation to select areas within input image 105. In this case, the computer program selects only those elements that correspond to areas of the image that were selected by the user. As explained in detail below, the non-selected elements are "frozen" in the sense that they are treated as read-only. The computer program, however, updates the selected elements.

The computer program selects the kernel as a function of the artistic effect desired by the user (step 407) and applies the kernel 110 to mesh 120 (step 209). In order to apply the kernel, the computer program scans the mesh and processes each selected element according to the transformation function defined by the kernel. The computer program uses the displacement values from selected and non-selected elements as inputs to the kernel, but only modifies the selected elements of mesh 120.

More specifically, the computer program centers the kernel 110 on a first element of mesh 120 such that the entire kernel 110 overlaps with mesh 120. For example, assuming the selected kernel is kernel 303, the computer program offsets kernel 303 one element in the horizontal direction and one element in the vertical direction so that all nine elements of kernel 303 correspond to an element of mesh 120. Next, the computer program reads the displacement values of each element of mesh 120 that corresponds to one of the nine elements of kernel 303. The computer program multiplies each of the read displacement values by the "multiplication factor" stored within the corresponding element of kernel 303. Notably, the multiplication factor can be a number or a matrix as described above. After multiplying the displacement values of each elements of the mesh underlying the kernel, the computer program sums the scaled displacement values and divides by a constant C. For example, the constant C for kernel 303 equals 4. For kernels 305, 307, and 309, C equals 32, 256 and 2048, respectively. For an integer power K, $C=2_{3K-1}$, and the elements of the kernel sum up to 1. In the conformal case one choice of the kernel corresponds to C=1 and the elements sum up to the unit matrix:

$$\begin{pmatrix} 1 & 0 \\ 0 & 1 \end{pmatrix}$$

After summing the pre-multiplied displacement values and dividing the result by C, the computer program writes the new displacement value into the element of mesh 120 corresponding to the center element of the kernel.

For integer power kernels, the computer program independently applies the selected kernel to the displacement values of each element. For kernel 301, however, the computer program treats the displacement values of the mesh as a vector and applies kernel 301 as a 3×3 array of 2×2 matrices, e.g., matrix 311. For a given element within mesh 120, iteration engine multiples the stored vector of displacement values by the corresponding matrix within kernel 301. The resultant vectors are summed, divided by C and written into the element of mesh 120 corresponding to the center of kernel 301.

The following pseudo-code illustrates one implementation for updating the displacement values for a given element M (x, y) of mesh 120. In the following pseudo-code, M (x,y) represent the current element of mesh 120, S represents the sum of the multiplied displacement values of the mesh elements corresponding to the kernel elements, and C represents a normalizing constant as described above.

For each selected element M(x,y) of the Mesh {
   Center the selected kernel on M(x,y);
   Multiply the displacement values of each element of
    the
    Mesh by the corresponding element of the
    selected kernel;
   S=Sum of the multiplied displacement values;
   M(x,y)=S * C', where C' =1/C;
}

Because the new displacement values can be calculated independently, in one implementation the computer program calculates the new displacement values in parallel.

The computer program (step 411) iteratively repeats the application of the kernel (step 409) until the displacement values within mesh 120 reaches a termination condition. In one implementation, the computer program applies the selected kernel a predetermined number of times. In another implementation, the computer program monitors mesh 120 to determine whether the displacement values have stabilized and converged to a fixed point, such as a solution of Laplace's equation. The number of iterations necessary to reach the termination condition varies with the complexity of the kernel an mesh size, but for K=1 (harmonic kernel) it typically is less than fifty iterations for an image of average size. For larger K the number of iterations increases. The conformal kernel reaches the termination condition in approximately ten iterations. After iteratively applying a kernel to mesh 120, the user can preview the resulting warped output image 107 and can elected to modify mesh 120 and repeat steps 403, 405, 407 and 411 until a desired warping effect is achieved.

Figure 5:
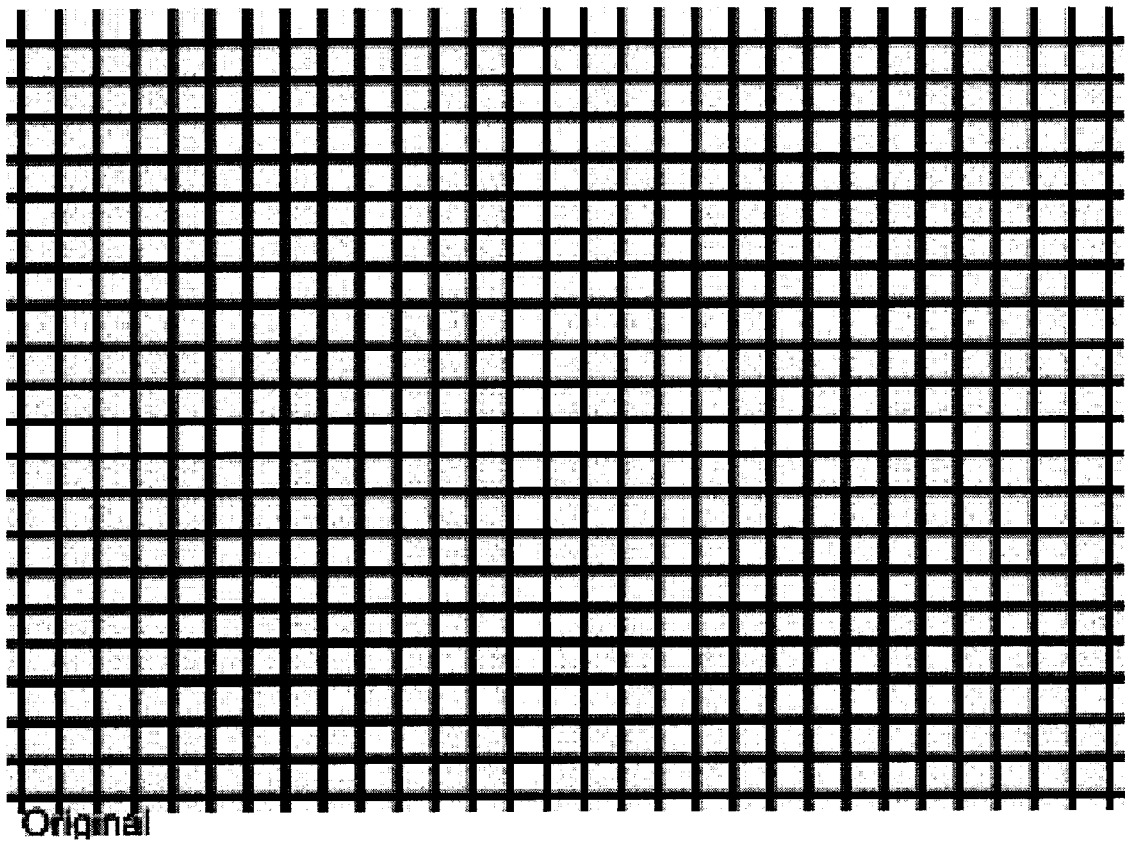
FIG. 5 illustrates an unwarped image of a mesh.
Figure 6:
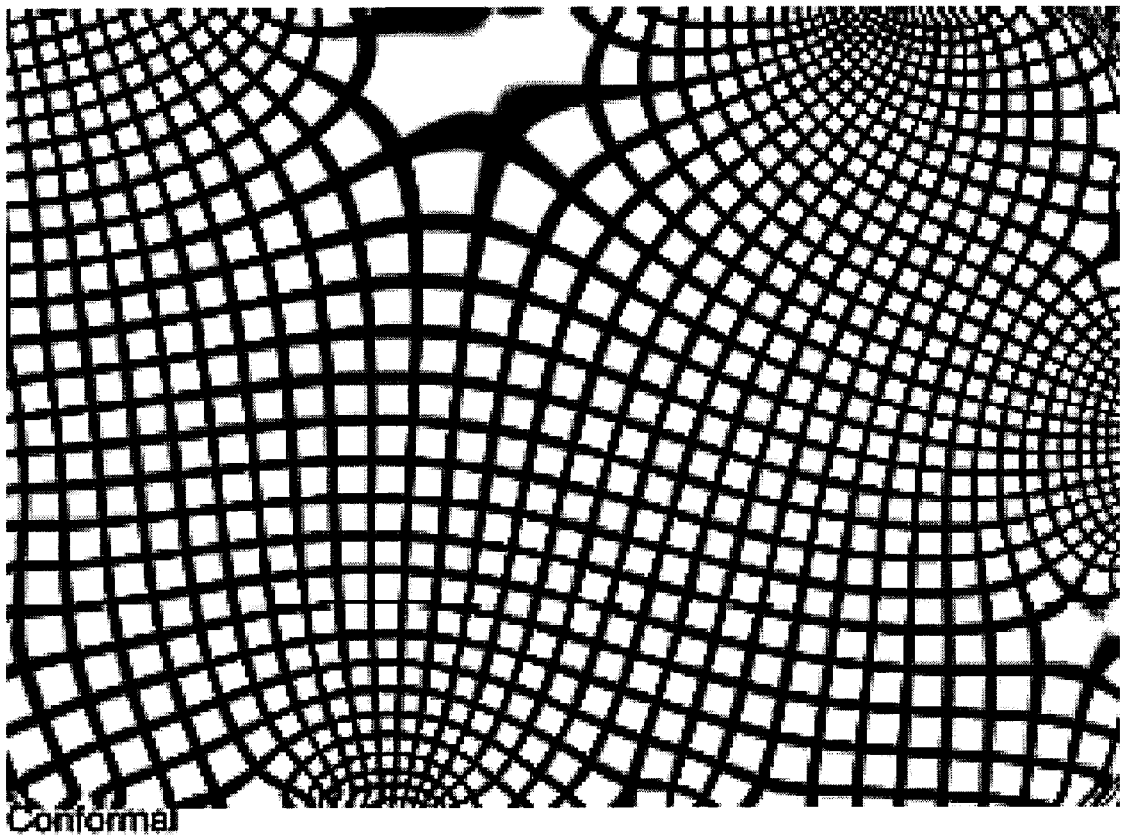
FIG. 6 illustrates the image after applying a conformal transformation according to the invention.
Figure 7:
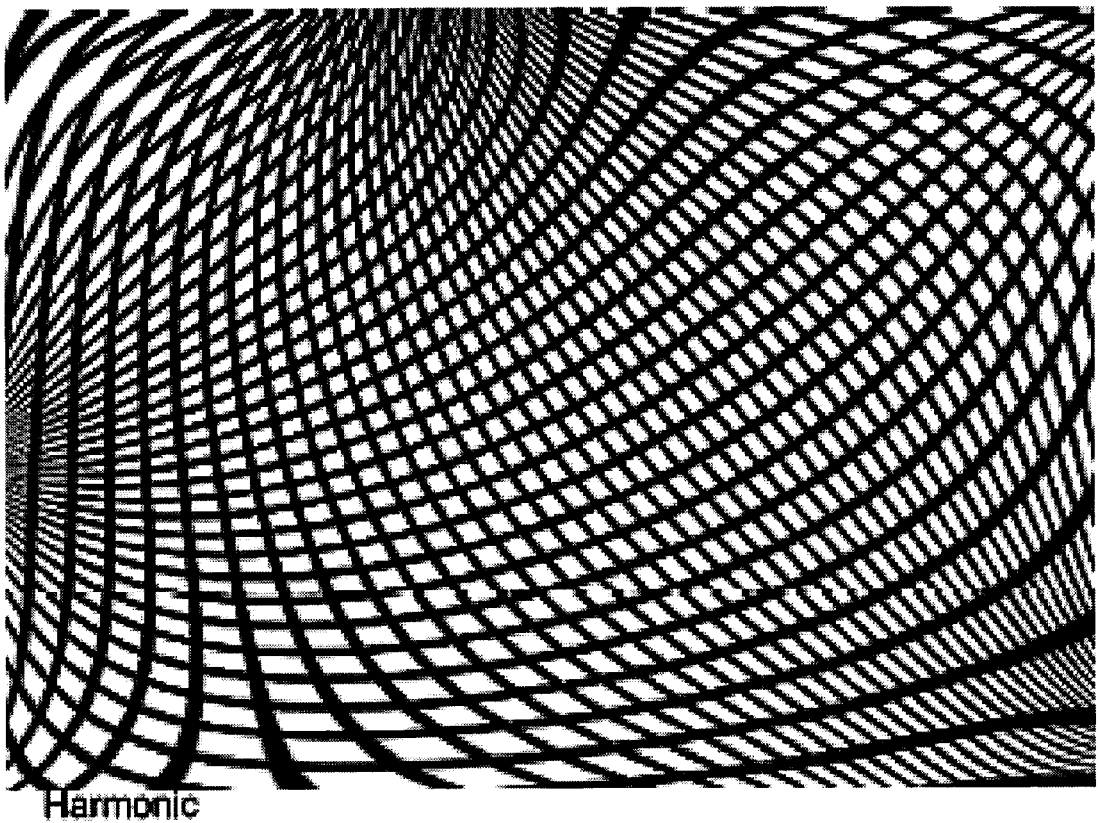
FIG. 7 illustrates the image after applying a harmonic transformation according to the invention.
Figure 8:
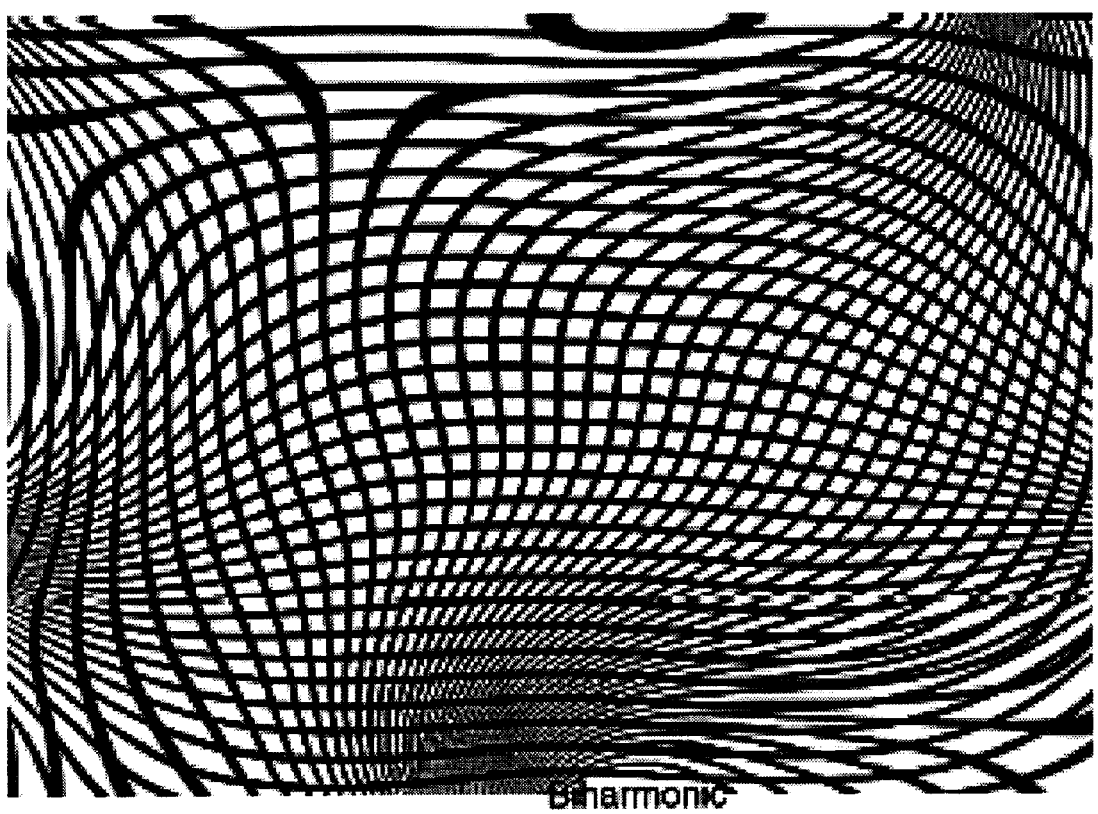
FIG. 8 illustrates the image after applying a bi-harmonic transformation according to the invention.

Once the desired effect is achieved, the computer program generates output image 107 by applying the resultant mesh 120 to input image 105, thereby warping input image 105 to achieve the desired artistic effect (step 413). FIG. 5 illustrates an image prior to the application of a kernel 110 by iteration engine 115. FIGS. 6, 7, and 8 illustrate output image 107 after iteration engine applies a conformal kernel, harmonic kernel or a bi-harmonic kernel, respectively.

Various embodiments have been described of a method and system that warp digital images to achieve a variety of desired effects. In one embodiment, the warping techniques select a plurality of elements from a mesh, each element of the mesh corresponding to one or more pixels of a digital image and containing one or more displacement values. A transformation kernel is iteratively applied to the mesh in order to update the selected elements with new displacement values until a termination condition is achieved. The resultant mesh is used to warp the digital image. The displacement values of the selected elements and the non-selected elements as used as inputs to the transformation function. The new displacement values generated by the transformation function are written to the selected elements without updating the displacement values of the non-selected elements.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable within an operating environment of a programmable system.

Figure 9:
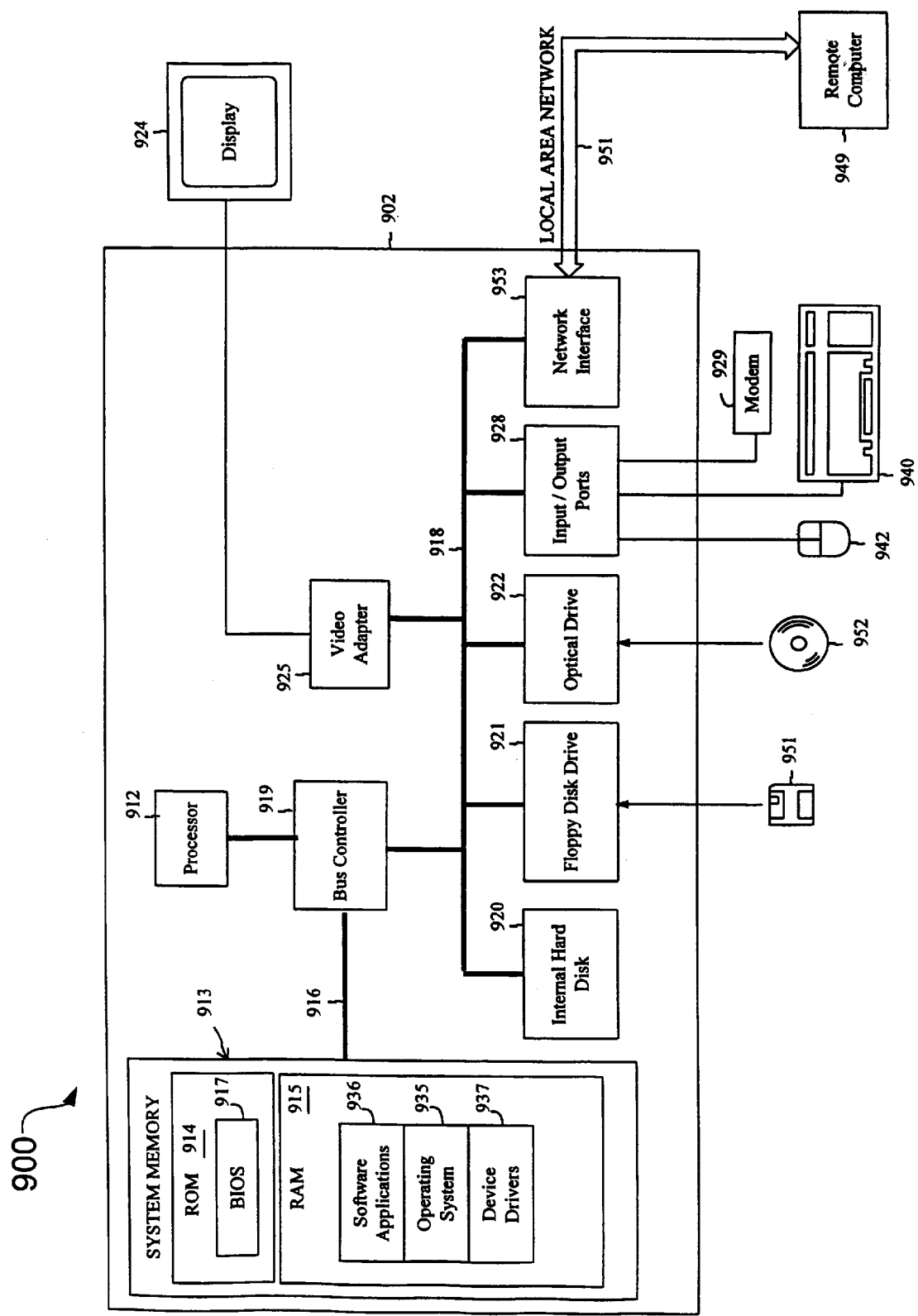
FIG. 9 is a block diagram illustrates one embodiment of a computer suitable for implementing the various embodiments of the invention.

An example of one such type of programmable processor is shown in FIG. 9, which shows a block diagram of a programmable processing system (system) 900 suitable for implementing or performing the apparatus or methods of the invention. As shown in FIG. 9, the system 900 includes a processor 112 that in one embodiment belongs to the PENTIUM® family of microprocessors manufactured by the Intel Corporation of Santa Clara, Calif. However, it should be understood that the invention can be implemented on computers based upon other microprocessors, such as the MIPS® family of microprocessors from the Silicon Graphics Corporation, the POWERPC® family of microprocessors from both the Motorola Corporation and the IBM Corporation, the PRECISION ARCHITECTURE® family of microprocessors from the Hewlett-Packard Company, the SPARC® family of microprocessors from the Sun Microsystems Corporation, or the ALPHA® family of microprocessors from the Compaq Computer Corporation. System 900 represents any server, personal computer, laptop or even a battery-powered, pocket-sized, mobile computer known as a hand-held PC or personal digital assistant (PDA).

System 900 includes system memory 913, including read only memory (ROM) 914 and random access memory (RAM) 915, which is connected to the processor 912 by a system data/address bus 916. ROM 914 represents any device that is primarily read-only including electrically erasable programmable read-only memory (EEPROM), flash memory, etc. RAM 915 represents any random access memory such as Synchronous Dynamic Random Access Memory.

Within the system 900, input/output bus 918 is connected to the data/address bus 916 via bus controller 919. In one embodiment, input/output bus 918 is implemented as a standard Peripheral Component Interconnect (PCI) bus. The bus controller 919 examines all signals from the processor 912 to route the signals to the appropriate bus. Signals between the processor 912 and the system memory 913 are merely passed through the bus controller 919. However, signals from the processor 912 intended for devices other than system memory 913 are routed onto the input/output bus 918.

Various devices are connected to the input/output bus 918 including hard disk drive 920, floppy drive 921 that is used to read floppy disk 951, and optical drive 922, such as a CD-ROM drive that is used to read an optical disk 952. The video display 924 or other kind of display device is connected to the input/output bus 918 via a video adapter 925.

Users enter commands and information into the system 900 by using a keyboard 940 and/or pointing device, such as a mouse 942, which are connected to bus 918 via input/output ports 928. Other types of pointing devices (not shown in FIG. 9) include track pads, track balls, joysticks, data gloves, head trackers, and other devices suitable for positioning a cursor on the video display 924.

As shown in FIG. 9, the system 900 also includes a modem 929. Although illustrated in FIG. 9 as external to the system 900, those of ordinary skill in the art will quickly recognize that the modem 929 may also be internal to the system 900. The modem 929 is typically used to communicate over wide area networks (not shown), such as the global Internet. Modem 929 may be connected to a network using either a wired or wireless connection.

Software applications 936 and data are typically stored via one of the memory storage devices, which may include the hard disk 920, floppy disk 951, CD-ROM 952 and are copied to RAM 915 for execution. In one embodiment, however, software applications 936 are stored in ROM 914 and are copied to RAM 915 for execution or are executed directly from ROM 914.

In general, the operating system 935 executes software applications 936 and carries out instructions issued by the user. For example, when the user wants to load a software application 936, the operating system 935 interprets the instruction and causes the processor 912 to load software application 936 into RAM 915 from either the hard disk 920 or the optical disk 952. Once one of the software applications 936 is loaded into the RAM 915, it can be used by the processor 912. In case of large software applications 936, processor 912 loads various portions of program modules into RAM 915 as needed.

The Basic Input/Output System (BIOS) 917 for the system 900 is stored in ROM 914 and is loaded into RAM 915 upon booting. Those skilled in the art will recognize that the BIOS 917 is a set of basic executable routines that have conventionally helped to transfer information between the computing resources within the system 900. Operating system 935 or other software applications 936 use these low-level service routines. In one embodiment system 900 includes a registry (not shown) that is a system database that holds configuration information for system 900. For example, the Windows® operating system by Microsoft Corporation of Redmond, Washington, maintains the registry in two hidden files, called USER.DAT and SYSTEM.DAT, located on a permanent storage device such as an internal disk.

The invention has been described in terms of particular embodiments. Other embodiments are within the scope of the following claims. For example, the steps of the invention can be performed in a different order and still achieve desirable results. This application is intended to cover any adaptation or variation of the present invention. It is intended that this invention be limited only by the claims and equivalents thereof.

What is claimed is:

1. A method for warping a digital image using a displacement map comprising:

generating a set of K kernels by convolving a kernel, representing either the Laplacean operator or the Cauchy-Riemann operator, upon itself K-1 times;

selecting a plurality of elements of a displacement map according to input received from a user, wherein each element contains a displacement vector having a vertical displacement value and a horizontal displacement value for mapping destination pixels of an output image to source pixels of an input image;

selecting a first kernel from the set of K kernels according to user input and applying the first kernel iteratively to the displacement map in order to update the selected elements with new displacement vectors having displacement values that represent a solution to a corresponding differential equation, wherein the solution is a function of boundary conditions defined by the selected elements of displacement map;

additionally applying iteratively one or more of the kernels, selected from the set of K kernels according to user input, to the displacement map to further update the displacement vectors of the selected elements; and generating an output image by mapping destination pixels within the output image to source pixels within the input image according to the updated displacement vectors of the displacement map.

2. The method of claim 1, wherein the kernels are applied to the displacement values of each element independently from the other displacement values of the element.

3. The method of claim 1, wherein the kernels are applied to the displacement values of each element by treating the displacement values of each element as complex numbers.

4. A method for processing a digital image, comprising:

displaying an input digital image, the input digital image being defined by a raster of source pixels;

establishing a warping mesh corresponding to the input digital image, the mesh having a plurality of elements, each mesh element corresponding to one or more source pixels, each mesh element maintaining one or more displacement values for its corresponding one or more source pixels;

receiving user input selecting an artistic effect and an area within the input digital image to which the artistic effect is to be applied;

selecting a transformation kernel based on the selected artistic effect, the kernel being defined to construct a transformation function corresponding to the selected artistic effect when the kernel is applied to the warping mesh; and applying iteratively the selected kernel to the warping mesh until a termination condition is satisfied to generate a final warping mesh, the application of the kernel taking as inputs displacement values of all elements of the mesh but updating only the displacement values of mesh elements corresponding to the selected area of the input digital image while leaving unchanged all mesh elements not corresponding to the selected area; and applying the final warping mesh to the input digital image to produce a warped output digital image, whereby the input image is warped to achieve the user-selected artistic effect.

5. The method of claim 4 further comprising:

receiving a user input defining initial displacement values for one or more elements in the warping mesh.

6. The method of claim 4, wherein receiving user input selecting an artistic effect and an area comprises:

receiving a user selection of a computer-generated paintbrush corresponding to an artistic effect; and selecting one or more regions in response to a user input gesture moving the selected paintbrush over the input digital image.

7. The method of claim 4, wherein applying iteratively the selected kernel to the warping mesh comprises:

applying the selected kernel independently to a horizontal and a vertical displacement value of each element if the selected kernel is an integer kernel; and applying the selected kernel to a displacement vector of each element if the selected kernel is a half-integer kernel.

8. The method of claim 4, wherein the termination condition includes applying the kernel a predefined number of times.

9. The method of claim 4, wherein the termination condition includes the convergence of the displacement values of the updated elements to a fixed point.

10. The method of claim 4, wherein applying the warping mesh to the input digital image comprises:

mapping pixels in the input digital image to the output digital image in accordance with the displacement values in the warping mesh.

11. The method of claim 4, wherein the displacement values of the elements in the warping mesh corresponding to selected and non-selected areas of the input digital image converge to an approximate solution to an equation related to Laplace's equation after the iterative application of the selected kernel.

12. The method of claim 11, wherein the equation related to Laplace's equation is Laplace's equation to a power of (N−1)/2, N being an integer greater than one.

13. The method of claim 4, wherein applying iteratively the selected kernel to the warping mesh comprises:

applying the selected kernel independently to each element in the warping mesh corresponding to a selected area of the input digital image.

14. A computer program product, tangibly stored on a computer-readable medium, for processing a digital image, the product comprising instructions operable to cause a programmable processor to:

display an input digital image, the input digital image being defined by a raster of source pixels;

establish a warping mesh corresponding to the input digital image, the mesh having a plurality of elements, each mesh element corresponding to one or more source pixels, each mesh element maintaining one or more displacement values for its corresponding one or more source pixels;

receive user input selecting an artistic effect and an area within the input digital image to which the artistic effect is to be applied;

select a transformation kernel based on the selected artistic effect, the kernel being defined to construct a transformation function corresponding to the selected artistic effect when the kernel is applied to the warping mesh; and apply iteratively the selected kernel to the warping mesh until a termination condition is satisfied to generate a final warping mesh, the application of the kernel taking as inputs displacement values of all elements of the mesh but updating only the displacement values of mesh elements corresponding to the selected area of the input digital image while leaving unchanged all mesh elements not corresponding to the selected area; and apply the final warping mesh to the input digital image to produce a warped output digital image, whereby the input image is warped to achieve the user-selected artistic effect.

15. The computer program product of claim 14, further comprising instructions to:

receive a user input defining initial displacement values for one or more elements in the warping mesh.

16. The computer program product of claim 14, wherein the instructions to receive a user input selecting an artistic effect and an area comprise instructions to:

receive a user selection of a computer-generated paintbrush corresponding to an artistic effect; and select one or more regions in response to a user input gesture moving the selected paintbrush over the input digital image.

17. The computer program product of claim 14, wherein the instructions to apply the selected kernel independently to a horizontal and a vertical displacement value of each element if the selected kernel is an integer kernel; and apply the selected kernel to a displacement vector of each element if the selected kernel is a half-integer kernel.

18. The computer program product of claim 14, wherein the termination condition includes applying the kernel a predefined number of times.

19. The computer program product of claim 14, wherein the termination condition includes the convergence of the displacement values of the updated elements to a fixed point.

20. The computer program product of claim 14, wherein the instructions to apply the warping mesh to the input digital image comprises instructions to:

map pixels in the input digital image to the output digital image in accordance with the displacement values in the warping mesh.

21. The computer program product of claim 14, wherein the displacement values of the elements in the warping mesh corresponding to selected and non-selected areas of the input digital image converge to an approximate solution to an equation related to Laplace's equation after the iterative application of the selected kernel.

22. The computer program product of claim 21, wherein the equation related to Laplace's equation is Laplace's equation to a power of (N−1)/2, N being an integer greater than one.

23. The computer program product of claim 14, wherein the instructions to apply iteratively the selected kernel to the warping mesh comprises instructions to:

applying the selected kernel independently to each element in the warping mesh corresponding to a selected area of the input digital image.

* * * * *